United States Patent
Cioaca et al.

(10) Patent No.: US 7,622,830 B2
(45) Date of Patent: Nov. 24, 2009

(54) SUPPLY TOPOLOGY WITH POWER LIMITING FEEDBACK LOOP

(75) Inventors: Doru Cioaca, Cupertino, CA (US); Constantin Bucur, Santa Clara, CA (US); Alexandru Hartular, San Jose, CA (US); Marian Niculae, San Jose, CA (US)

(73) Assignee: O2Micro International Limited, Grand Cayman (KY)

( * ) Notice: Subject to any disclaimer, the term of this patent is extended or adjusted under 35 U.S.C. 154(b) by 323 days.

(21) Appl. No.: 11/520,943

(22) Filed: Sep. 13, 2006

(65) Prior Publication Data

US 2007/0007822 A1    Jan. 11, 2007

Related U.S. Application Data

(63) Continuation-in-part of application No. 10/055,810, filed on Jan. 23, 2002, now Pat. No. 7,126,241.

(60) Provisional application No. 60/309,459, filed on Aug. 1, 2001.

(51) Int. Cl.
*G01R 19/12* (2006.01)
(52) U.S. Cl. ................................... 307/152
(58) Field of Classification Search .............. 307/152
See application file for complete search history.

(56) References Cited

U.S. PATENT DOCUMENTS

| | | | |
|---|---|---|---|
| 5,184,059 A | 2/1993 | Patino et al. | |
| 5,377,091 A * | 12/1994 | Faulk | 363/21.16 |
| 5,818,197 A | 10/1998 | Miller et al. | |
| 5,990,665 A * | 11/1999 | Kawata et al. | 320/162 |
| 6,058,034 A | 5/2000 | Cummings et al. | |
| 6,101,102 A * | 8/2000 | Brand et al. | 363/15 |
| 6,246,215 B1 | 6/2001 | Popescu-Stanesti | |
| 6,329,796 B1 | 12/2001 | Popescu | |
| 6,452,364 B1 | 9/2002 | Saeki et al. | |
| 6,498,461 B1 | 12/2002 | Bucur | |
| 6,538,341 B1 * | 3/2003 | Lang | 307/18 |
| 6,611,129 B2 | 8/2003 | Bucur | |
| 6,741,066 B1 | 5/2004 | Densham et al. | |
| 2004/0145348 A1 | 7/2004 | Bucur et al. | |

* cited by examiner

*Primary Examiner*—Robert L. DeBeradinis

(57) ABSTRACT

A supply topology comprising an AC to DC or DC to DC adapter and an electronic device with an active system, a battery, and an adapter controller implements closed-loop control of adapter output voltage to limit power consumption by the electronic device to a value related to maximum adapter power. The adapter couples a signal representing maximum adapter power to a control line connected to the electronic device and the electronic device couples an error signal representing the difference between instantaneous power consumption and adapter maximum power onto the same control line. The adapter adjusts its output voltage in response to the magnitude of the error signal. An adapter controller in the electronic device sets a limit for allocating current to battery charging from the signal representing maximum adapter power, with battery charging current approaching zero as instantaneous power consumption approaches maximum adapter power. The adapter controller adjusts the limit for allocating current to battery charging in response to new values of adapter maximum power associated with alternate adapters connected to the electronic device.

25 Claims, 3 Drawing Sheets

SUPPLY TOPOLOGY WITH POWER LIMITING FEEDBACK LOOP

CROSS REFERENCE TO RELATED APPLICATIONS

This application is a continuation-in-part of U.S. Nonprovisional application Ser. No. 10/055,810, filed Jan. 23, 2002, now U.S. Pat. No. 7,126,241, and entitled "Intelligent Adapter", incorporated herein by reference, and claims the benefit of the filing date of U.S. Provisional Application No. 60/309,459, filed on Aug. 1, 2001, also incorporated herein by reference.

FIELD OF THE INVENTION

The present invention relates to power supply circuits, and more particularly, to power supply circuits having an adapter that generates a signal related to available or maximum power and to electronic devices configured to receive this signal. Particular utility for the present invention is in portable electronic devices; however, the present invention is equally applicable to any device that uses an adapter to provide power.

BACKGROUND

Many electronic devices such as computers, cellular phones, radios, printers, and personal digital assistants use an alternating current (AC) to direct current (DC) adapter or DC to DC adapter to power the device and charge the device's batteries. For example, an AC to DC adapter ("AC/DC Adapter". "AC Adapter", or "Adapter") plugs into an AC electrical outlet and converts 100-240 volt, 50-60 Hz AC input voltage and current into a DC output voltage and current for use by an electronic device. A DC to DC adapter converts a DC input current of one voltage to a DC output current of another voltage. DC to DC adapters ("DC/DC Adapter", "DC Adapter" or "Adapter") are often used to power electronic devices from an accessory connector in a vehicle such as an automobile, boat, or airplane.

Adapter output current and voltage are coupled to an input power rail in the electronic device. For electronic devices having a battery or other energy storage device to supply operating power when an adapter is unavailable, output current and voltage from the battery or energy storage device are also coupled to the input power rail. Other components connected to the input power rail detect the presence of an adapter or battery, convert adapter output voltage and battery output voltage to other voltages used by active systems within the electronic device, and charge the battery.

For conventional power supply circuits, a value for maximum adapter power is generally chosen to be large enough to simultaneously supply the loads from active systems in the electronic device and battery charging. Also, adapters used in conventional power supply circuits generally have an output voltage that is substantially higher than the battery output voltage. For example, in an electronic device with a three-cell lithium-ion battery, the battery output voltage on the input power rail varies between about 9 volts DC (VDC) and about 13.5 VDC, depending on battery charge condition. With a conventional supply power supply circuit, adapter output voltage on the input power rail varies in a range from about 16.8 VDC to about 19 VDC and components connected to the input power rail are rated to withstand about 30 VDC to allow for design margins. The large difference between the output voltage of conventional adapters and battery output voltage affects the cost and size of components connected to the input power rail. Components rated to withstand 30 V are larger and more expensive than components rated for lower voltages. Furthermore, voltage converters and other components operate at lower electrical efficiency from adapter input power compared to battery power when the difference between adapter voltage and battery voltage is large. Lower electrical efficiency causes increased dissipation within the electronic device and affects many system parameters such as component operating temperatures, size and cost of active and passive cooling components, printed circuit board area, and enclosure size and complexity.

Recent efforts have sought to improve conventional power supply circuits by including a power allocation controller in the electronic device to apportion adapter output power between active systems and battery charging. In an exemplary power supply circuit, a power allocation controller reduces battery charging current when power consumed by the electronic device exceeds a fixed allocation limit corresponding to maximum adapter current. In another exemplary power supply circuit, the fixed allocation limit corresponds to maximum adapter power. An allocation controller permits the use of a smaller adapter compared to conventional power supply circuits because the maximum load from active systems and the maximum load from battery charging do not occur concurrently.

A power allocation controller is generally configured for a particular fixed allocation limit by connecting resistors or other components to programming inputs on the power allocation controller. However, if alternate adapters requiring different allocation limits are available to be coupled to an electronic device, for example a lightweight travel adapter with a small maximum power rating and a larger docking station adapter or fast-charge adapter with a higher maximum power rating, the power allocation controller in the electronic device will be unable to adjust its operation to the allocation limit associated with each alternate adapter, using instead the fixed allocation limit set at the time the electronic device was manufactured. Mismatched allocation limits raise the possibility that battery charging will not proceed at a desired rate or that the maximum adapter power may be exceeded by the electronic device. An example of power allocation control with a fixed power allocation limit is provided in U.S. Pat. No. 6,611,129.

Other efforts have been directed at passing one or more fixed values relating to adapter specifications such as maximum current or maximum power from an adapter to an electronic device modified to receive the values. An electronic device modified to receive fixed values related to adapter parameters can determine how much adapter output current to allocate between battery charging circuits and active systems or make other decisions about operating modes for the electronic device. In one exemplary power supply circuit, an electronic device receives information about an adapter but does not use the information to modify the adapter's output voltage, that is, there is no closed-loop control of adapter output voltage by the electronic device. Without closed-loop control of adapter output voltage, the necessity for a large difference between adapter output voltage and battery voltage remains, leading to lower power efficiency as earlier described. An example is provided in U.S. Pat. No. 6,058,034.

SUMMARY

In one aspect the present invention provides a supply circuit with an AC to DC or DC to DC adapter coupled to an electronic device comprising an adapter controller, a rechargeable battery, and an active system for implementing one or more functions provided by the electronic device. The adapter generates DC output current and voltage for supplying power to the adapter controller and active system and for charging the battery. In one embodiment, the difference between the adapter output voltage and the battery voltage is a few hundred millivolts, a small fraction of the difference between adapter voltage and battery voltage in a conventional adapter. The adapter portion of one embodiment of the invention generates a reference voltage related to the maximum adapter power. The reference voltage is coupled to an adapter control line connected from the adapter to the electronic device and to the adapter controller. The adapter controller generates a signal related to instantaneous power consumption by the electronic device from an input signal related to adapter output voltage and a signal related to current consumption and compares the instantaneous power consumption signal to the reference voltage representing maximum adapter power. The adapter controller uses the result of the comparison to form an adapter control signal whose magnitude is zero when instantaneous power consumption is less than or equal to maximum adapter power, otherwise the adapter control signal has a magnitude related to the difference between instantaneous power consumption and maximum adapter power. The adapter controller couples the adapter control signal to the adapter control line.

The adapter receives the adapter control signal and adjusts the adapter output voltage in response to the magnitude of the adapter control signal. For an adapter control signal of zero magnitude, corresponding to a condition where instantaneous power consumption is less then or equal to maximum adapter power, the adapter output voltage is held to its nominal value, plus or minus regulation tolerances. An adapter control signal of nonzero magnitude causes a related decrease in adapter output voltage, corresponding to a decrease in the power consumption of the electronic device. The adjustment of adapter output voltage by a control signal formed by the adapter controller from a comparison between instantaneous power consumption and a limit corresponding to maximum adapter power represents closed-loop control by the adapter controller.

In another aspect, the reference voltage related to maximum adapter power, coupled to the adapter controller on the adapter control line, represents a control limit below which the adapter controller permits adapter output power to be shared between the active system and a battery in the electronic device. Power for charging the battery approaches zero as power consumed by the active system approaches the maximum adapter power. When the sum of the power consumed by the active system and by battery charging exceeds the control limit, adapter output voltage, and consequently power for charging the battery, is reduced until the adapter output power control loop stabilizes with instantaneous power consumption equal to maximum adapter power. Further increases in power consumption by the active system cause further reductions in power for battery charging, until the active system is consuming the maximum adapter power and no battery charging occurs. In one embodiment, if the active system increases power consumption beyond the maximum adapter power, the battery supplies power to the active system. Conversely, as power drawn by the active system falls below maximum adapter power, an increasing amount of power is available from the adapter for battery charging. When the active system is in a quiescent state, most of the adapter's maximum power is available for battery charging.

This section summarizes some features of the invention. These and other features, aspects, and advantages of the embodiments of the invention will become better understood with regard to the following description and upon reference to the following drawings, wherein:

DESCRIPTION

The embodiments described in this section illustrate but do not limit the invention. The invention is not limited to any particular circuitry, voltage values, current values, battery chemistry, or other parameters.

Figure 1:
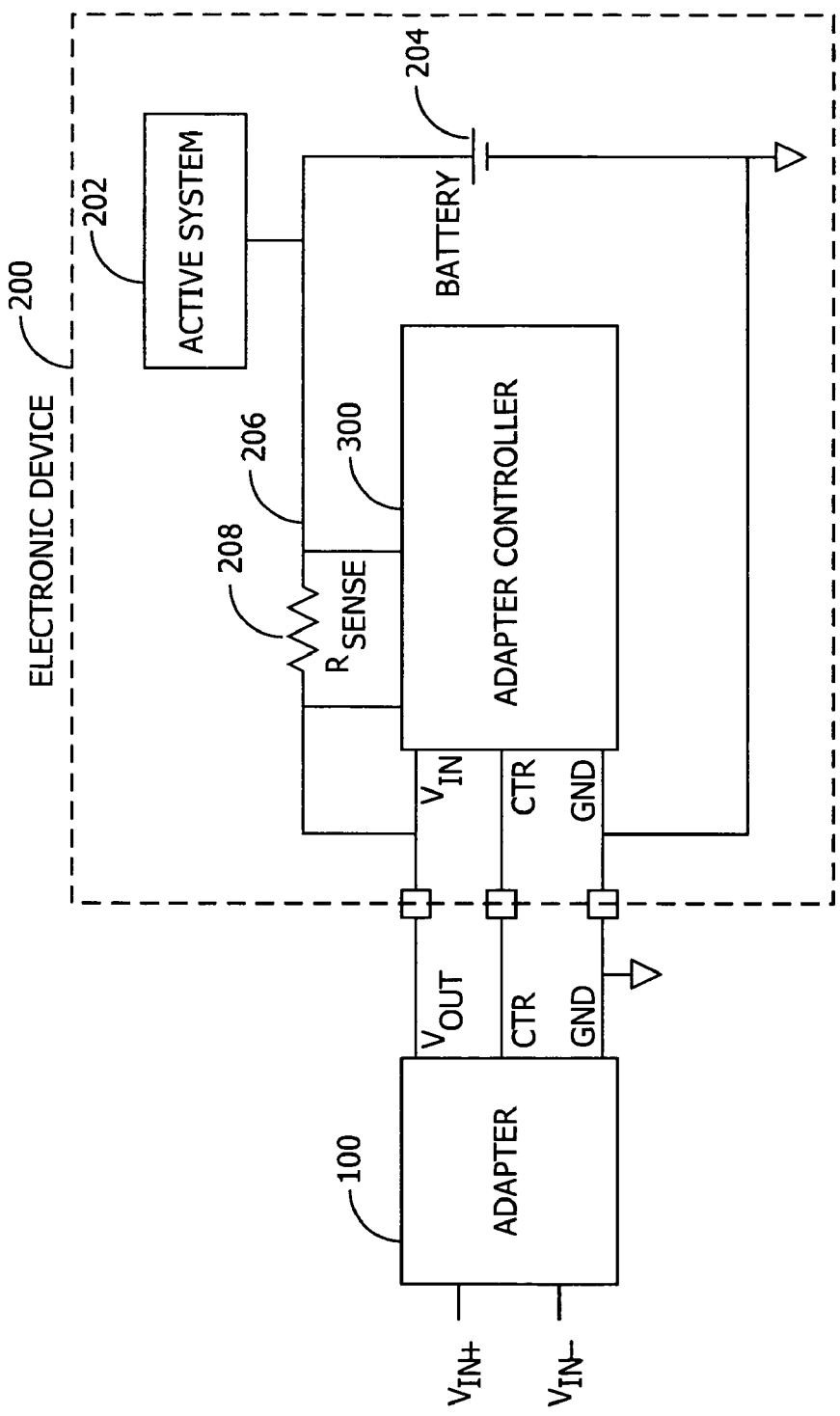
FIG. 1 shows a block diagram for one embodiment of the invention.

FIG. 1 depicts a block diagram of one embodiment of the invention. As a broad overview, an AC to DC adapter 100 converts an AC input voltage to a DC output voltage through the operation of a power converter. In one embodiment, the power converter is a flyback converter. The adapter's DC output voltage and current are coupled to input terminals on an electronic device 200 comprising an input power rail represented by line 206, an active system 202, a rechargeable battery 204, and an adapter controller 300. In one embodiment, the rechargeable battery 204 is a lithium ion battery. In other embodiments, lithium ion polymer, nickel metal hydride, nickel cadmium, lead-acid, or other rechargeable batteries or equivalent rechargeable storage devices for electrical energy are used. The active system 202 comprises the electrical and electronic components that implement the functionality provided by the electronic device 200. The adapter controller 300 measures voltages and currents related to the adapter 100, active system 202, and battery 204, and implements closed-loop control of adapter output to efficiently charge the battery 204 and supply the power demands of the active system 202.

The adapter controller 300 measures input voltage to the electronic device 200 and another voltage related to current consumption by the electronic device 200 and generates a signal representing instantaneous power consumption. The adapter controller 300 compares the signal representing instantaneous power consumption to a reference signal from the adapter 100 that is related to the value of maximum adapter power and generates a control signal current output that is related to an amount by which instantaneous power consumption exceeds the maximum adapter power. The control signal current output is coupled to an adapter control line connected between a terminal CTR on the electronic device 200 and the corresponding CTR terminal on the adapter 100 and represents a feedback signal from the adapter controller 300 to the adapter 100. The output of the power converter in the adapter 100 is modified in response to the magnitude of the control signal, enabling closed-loop control of adapter 100 output. The control loop operates to cause a decrease in adapter output voltage related to the magnitude of the control signal current from the adapter controller 300.

Placing the output voltage of the adapter 100 under closed-loop control causes the adapter's output voltage to remain within a small range close to the battery output voltage. In many types of electronic devices, the current drawn by the active system 202 is adjusted by the active system 202 in response to changes in adapter output voltage, in effect maintaining constant power consumption by the active system 202. Current available for battery charging is therefore the difference between output current from the adapter 100 and current drawn by the active system 202, minus a small amount of current consumed by the adapter controller 300. When power consumed by the active system 202 alone is sufficient to cause instantaneous power consumption to exceed the maximum adapter power, the adapter output voltage is reduced by the action of closed-loop control until the adapter output voltage is essentially equal to the battery voltage, reducing current flow into the battery 204 and eventually ending battery charging. Conversely, when the active system 202 is in a quiescent or low-power state, an increasing amount of power, up to the maximum power output of the adapter 100, is available for charging the battery 204.

Figure 2:
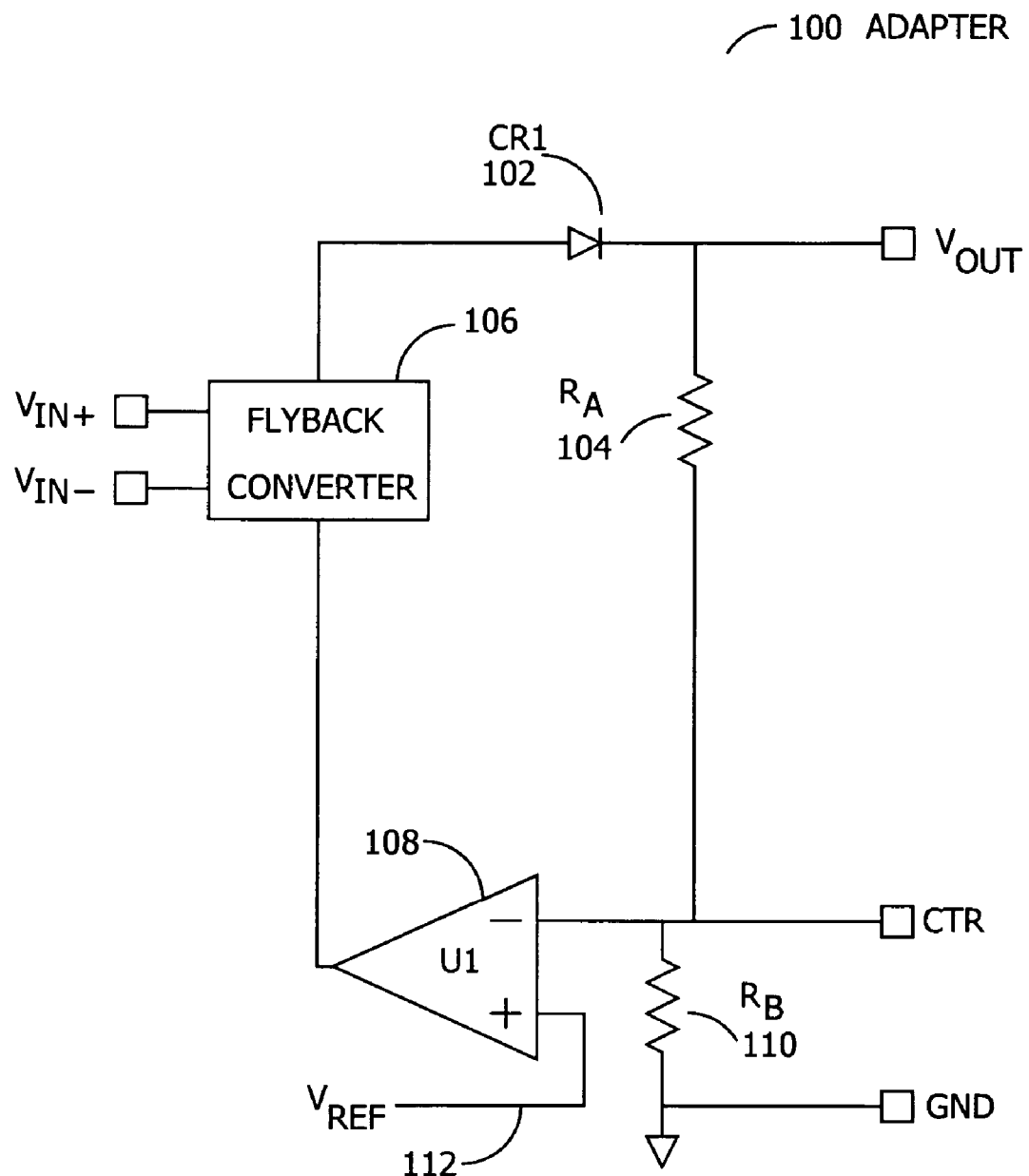
FIG. 2 shows a schematic of one embodiment of an adapter.

FIG. 2 shows the adapter portion of one embodiment. An adapter 100 comprises a flyback converter 106, an operational amplifier U1 108, a rectifier CR1 102, and resistors $R_A$ 104 and $R_B$ 110. The input voltage and current to be converted to DC output by the adapter 100 are coupled to the flyback converter 106 on terminals $V_{IN+}$ and $V_{IN-}$. In one embodiment the input voltages coupled to terminals $V_{IN+}$ and $V_{IN-}$ are AC voltages. In another embodiment the input voltages are DC voltages. The design of flyback converters is well known in the art and will not be described herein. One skilled in the art will recognize that other power converter configurations may be used instead of a flyback converter to convert input voltages and currents to DC output. The DC output of the flyback converter 106 is connected to the anode of a rectifier CR1 102. The cathode of the rectifier CR1 102 is connected to an output terminal $V_{OUT}$. A resistor $R_A$ is connected between the terminal $V_{OUT}$ and a terminal CTR, and a resistor $R_B$ is connected between the terminal CTR and a terminal GND. The terminal GND is the ground reference connection for the adapter. Resistors $R_A$ and $R_B$ determine the nominal output voltage $V_{AD}$ of the adapter 100. In the embodiment shown in FIG. 2, the terminal CTR couples voltage $V_{REF}$ from the adapter to an adapter controller in an electronic device, and further couples an adapter control current signal from the adapter controller to the adapter. In an alternate embodiment, a fourth terminal is added for connections between the adapter and an electronic device, and voltage $V_{REF}$ and the adapter control current signal are coupled to different terminals.

The output of an operational amplifier U1 108 is connected to a duty cycle control input to the flyback converter 106. Increasing the voltage on the duty cycle control input causes the adapter output voltage $V_{AD}$ to increase. Decreasing the duty cycle input control voltage causes $V_{AD}$ to decrease. The inverting input of operational amplifier U1 108 is connected to the adapter 100 terminal CTR. The inverting input of operational amplifier U1 108 is further connected to the voltage divider formed by the resistors $R_A$ 104 and $R_B$ 110. The noninverting input of operational amplifier U1 108 is connected to a reference voltage $V_{REF}$ on line 112. A value for $V_{REF}$ is chosen when the adapter 100 is designed such that $V_{REF}$ is related to the maximum power output $P_{ADMAX}$ from the adapter 100. One skilled in the art will recognize that an alternative to selecting a value for $V_{REF}$ 112 corresponding to $P_{ADMAX}$ is to select a fixed value of $V_{REF}$ and replace resistor $R_A$ 104 with two or more resistors in series, the resistors in series having a combined resistance equal to $R_A$ 104. The values of the individual series resistors are selected so that the voltage drop across each resistor, plus $V_{REF}$, cumulatively sum to the desired reference voltage corresponding to the maximum power output $P_{ADMAX}$ from the adapter 100, and the adapter 100 terminal CTR is connected to the corresponding resistor.

Terminals $V_{OUT}$, CTR, and GND on adapter 100 are connected to the corresponding terminals $V_{IN}$, CTR, and GND on electronic device 200, as shown in FIG. 1. An adapter control current flows from the adapter controller 300 into the adapter 100 terminal CTR. Inside adapter 100, the adapter control current flows through resistor $R_B$ 110 to ground, generating a voltage at the inverting terminal of the operational amplifier U1 108 that increases as the adapter control current increases. The output of operational amplifier U1 108 is related to the difference between $V_{REF}$ 112 and the voltage across resistor $R_B$ 110, the output decreasing as the voltage across resistor $R_B$ 110 increases. When the adapter control current has a value of zero (no current flow), the adapter output voltage $V_{AD}$ remains at its nominal value within the regulation limits of the adapter 100. As the adapter control current increases the output of U1 108 decreases, causing a corresponding decrease in $V_{AD}$.

Figure 3:
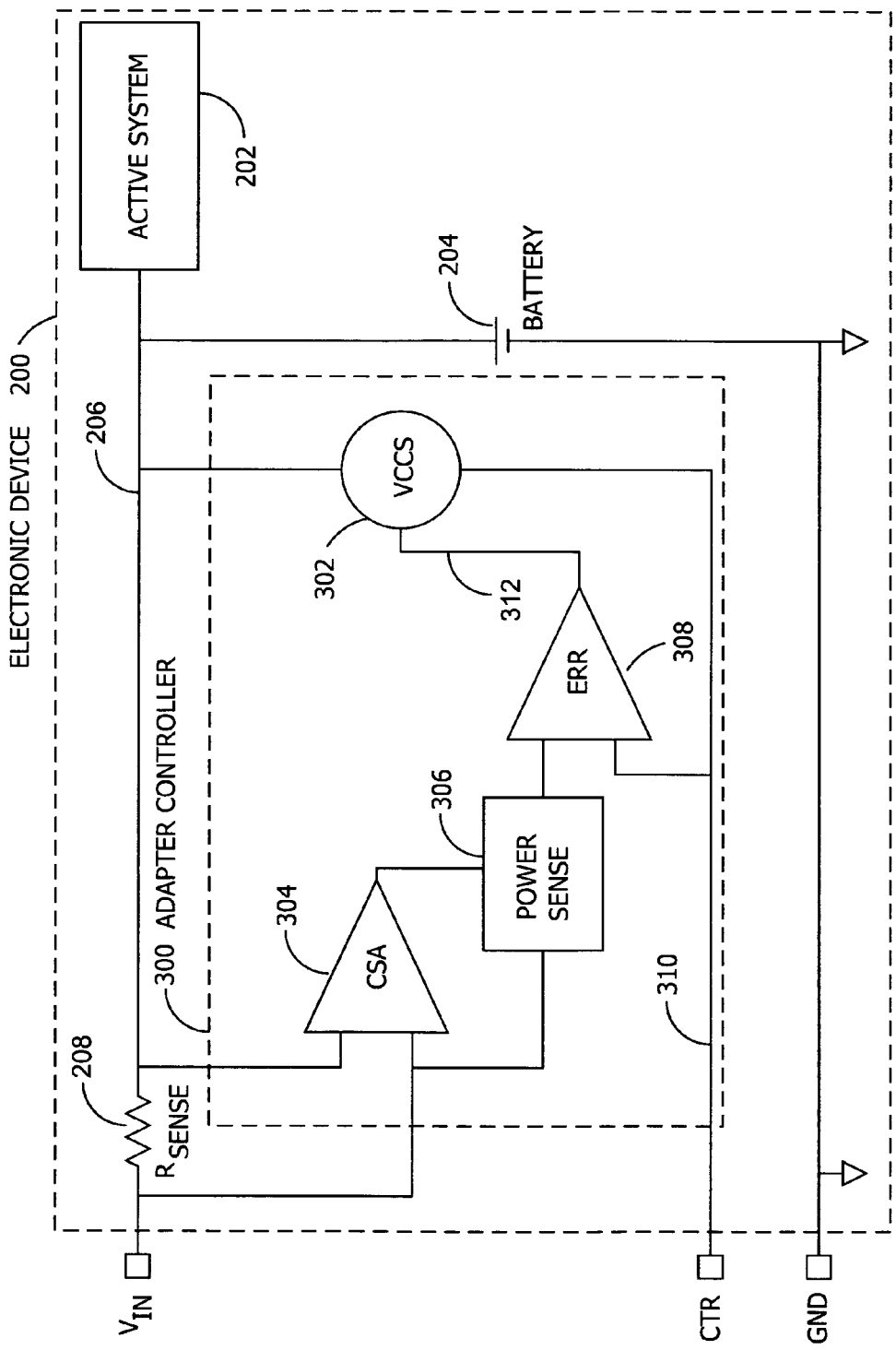
FIG. 3 shows a schematic of one embodiment of an electronic device comprising an active system, a battery, and an adapter controller.

FIG. 3 depicts one embodiment of an electronic device 200 having an adapter controller 300, an active system 202 for implementing the functions provided by electronic device 200, and a rechargeable battery 204. In other embodiments, the battery 204 is replaced with another rechargeable energy storage device, such as a rechargeable capacitive storage device. Output current $I_{AD}$ from the adapter 100 flows into input terminal $V_{IN}$ on the electronic device 200, through one or more sense resistors represented by $R_{SENSE}$ 208, and into the active system 202, a battery 204, and the adapter controller 300. Adapter output voltage $V_{AD}$ is coupled through terminal $V_{IN}$ to $R_{SENSE}$ 208. Inside the adapter controller 300, a current sense amplifier CSA 304 measures the differential voltage across sense resistor $R_{SENSE}$ 208 and outputs a signal related to current drawn by the electronic device 200. The signal related to current is one input to the Power Sense 306 functional block. A second input to the Power Sense 306 functional block is from a line coupled to terminal $V_{IN}$, corresponding to the value of the DC input voltage to the electronic device 200. The output of the Power Sense 306 functional block is a signal related to instantaneous power consumption by the electronic device 200. One skilled in the art will be familiar with the design of circuits to generate an output signal related to power from input signals related to voltage and current.

The output of the Power Sense 306 functional block is connected to a first input of an error amplifier ERR 308. A second input of error amplifier ERR 308 is coupled to terminal CTR and to the output of a voltage-controlled current source (VCCS) 302 on line 310. The design of voltage-controlled current sources is well known in the art and will not be described herein. The output of error amplifier ERR 308 connects to the control input of the VCCS 302 on line 312. A voltage supply input for the VCCS 302 is coupled to line 206, the input power rail for the electronic device 200.

The system input power rail 206 connects from sense resistor $R_{SENSE}$ 208 to a first terminal of the battery 204 and to a power input terminal on the active system 202. The voltage on the system input power rail 206 is equal to adapter output voltage $V_{AD}$ minus a small voltage across sense resistor $R_{SENSE}$ 208 when an adapter 100 is present and to battery voltage $V_{BAT}$ when an adapter 100 is not present. $V_{AD}$ is generally a few hundred millivolts higher than $V_{BAT}$.

During operation, the voltage at the adapter terminal CTR is held to the value $V_{REF}$ by operational amplifier U1 108. The voltage on line 310, applied to the second input of error amplifier ERR 308, is also equal to voltage $V_{REF}$ and is therefore related to the maximum adapter power $P_{ADMAX}$. The voltage at the first input to error amplifier ERR 308 represents instantaneous power consumption by the electronic device, as previously described. The output of error amplifier ERR 308 on line 312 is a voltage signal whose magnitude is related to the amount by which instantaneous power consumption exceeds $P_{ADMAX}$. The VCCS 302 accepts the voltage signal on line 312 and generates on line 310 an output current whose magnitude is related to the amount by which instantaneous power consumption exceeds $P_{ADMAX}$. The current output from the VCCS 302 on line 310 is zero while instantaneous power consumption is less than or equal to $P_{ADMAX}$. Current flowing from the VCCS 302 through terminals CTR into the adapter 100 causes a related decrease in the output voltage of the adapter 100 as previously described.

Line 310 performs two functions in the current embodiment. Line 310 couples a voltage signal from the adapter 100 to the error amplifier ERR 308 in the adapter controller 300. The voltage signal corresponds to the maximum adapter power $P_{ADMAX}$ and serves as a control threshold for closed loop control of adapter output voltage by the electronic device. Line 310 also couples a current signal from the VCCS 302 in the adapter controller 300 to the inverting input of U1 108 in the adapter 100. The current signal represents the amount by which instantaneous power consumption exceeds $P_{ADMAX}$ and functions as a feedback signal for modifying adapter output. Signals flowing bidirectionally on line 310 enable the electronic device 200 to achieve closed-loop control of adapter output voltage, detect maximum power differences between alternate adapters, manage power allocation, and control power consumption to prevent maximum adapter power from being exceeded. In an alternate embodiment, the voltage signal corresponding to $P_{ADMAX}$ from the adapter is coupled to the electronic device and then to the error amplifier ERR 308 on a terminal separate from terminal CTR and the current signal from the VCCS 302 is coupled on line 310 to terminal CTR.

While instantaneous power consumption remains less than $P_{ADMAX}$, adapter 100 output current $I_{AD}$ flows to both the active system 202 and the battery 204. The amount of current available for battery charging is the difference between $I_{AD}$ and the current drawn by the active system, minus a small amount consumed by the adapter controller 300. When instantaneous power consumption exceeds $P_{ADMAX}$, the adapter 100 output voltage $V_{AD}$ decreases under closed-loop control by error amplifier ERR 308 until instantaneous power consumption reaches control equilibrium with $P_{ADMAX}$. Decreasing $V_{AD}$ causes a corresponding decrease in charging current to the battery 204. As power consumption by the active system increases toward the maximum adapter power, $V_{AD}$ decreases toward the battery voltage and battery charging reduces to zero. Further increases in power consumption by the active system cause $V_{AD}$ to decrease to slightly less than the battery voltage and, in one embodiment, current flows out of the battery 204 and into the active system 202. Diodes and a switch (not shown) in line 206 prevent current from flowing from the battery 204 into the adapter 100. The adapter 100 reference voltage $V_{REF}$ on line 112 in FIG. 2 can therefore be understood to represent the limit above which the adapter controller 300 allocates adapter output power away from the battery 204 and toward the active system 202. If a battery 204 is not present or is discharged and instantaneous power consumption remains greater than $P_{ADMAX}$ due to power drawn by the active system 202, protection circuits within flyback converter 106 act to prevent overload damage to adapter 100. The design of overload protection circuits for adapters is well known in the art and will not be described herein.

In some embodiments, the output of more than one error amplifier is coupled to line 312, the control input of the VCCS 302. Each error amplifier with output connected to line 312 separately compares a measured value against a reference value for a parameter of interest. When the signal representing the measured value of the parameter of interest exceeds a control limit representing the reference value of the parameter of interest, the corresponding error amplifier generates a voltage signal on line 312, causing the VCCS to output a current signal on line 310 that leads to a corresponding decrease in adapter 100 output voltage, thereby implementing closed-loop control of the adapter output based on the parameter of interest. Multiple control loops may operate simultaneously, but the action of any one error amplifier in a system comprising multiple control loops is sufficient to cause a control current to be generated on line 310 to achieve closed loop control of adapter 100. In one embodiment, a control loop for adapter output current $I_{AD}$ is added to the adapter controller 300 by adding an error amplifier and providing a measured value and a limiting reference value for adapter output current as inputs to the error amplifier. In another embodiment, a control loop for battery voltage is added to the adapter controller 300. In another embodiment, a control loop for battery charge current is added to adapter controller 300.

In one embodiment, amplifiers CSA 304 and ERR 308 are implemented as operational transconductance amplifiers. In another embodiment, amplifiers CSA 304 and ERR 308 are implemented as operational amplifiers. One skilled in the art will recognize that the functions performed by amplifiers CSA 304 and ERR 308 may be achieved with operational amplifiers or transconductance amplifiers.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, or use of equivalent functional steps for steps described herein. Such insubstantial variations are to be considered within the scope of what is contemplated here. Moreover, if plural examples are given for specific means, or steps, and extrapolation between or beyond such given examples is obvious in view of the present disclosure, then the disclosure is to be deemed as effectively disclosing and thus covering at least such extrapolations.

RESERVATION OF EXTRA-PATENT RIGHTS, RESOLUTION OF CONFLICTS, AND INTERPRETATION OF TERMS

After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings.

We claim:

1. A power supply system, comprising:
    an AC/DC or DC/DC adapter comprising circuitry for generating a reference signal representative of a limitation in an adapter output parameter;
    an electronic device coupled to said adapter comprising circuitry for receiving power from said adapter, circuitry for receiving said reference signal and coupled to said adapter, circuitry for generating a second signal representative of an operating parameter of said electronic device and coupled to said circuitry for receiving power, and circuitry for generating an error signal related to an amount by which said second signal exceeds said reference signal and coupled to said circuitry for generating said second signal; and
    circuitry for modifying said adapter output parameter in response to said error signal and coupled to said circuitry for generating said error signal.

2. The power supply system as in claim 1, comprising:
    a first line for coupling power between said adapter and said electronic device;
    a second line for connecting a ground reference between said adapter and said electronic device; and
    a third line connecting said adapter and said electronic device wherein said reference signal is coupled onto said third line.

3. The power supply system as in claim 1, wherein said reference signal is representative of maximum adapter power.

4. The power supply system as in claim 3, wherein said error signal is representative of the amount by which instantaneous power consumption from said electronic device exceeds said maximum adapter power.

5. The power supply system as in claim 2, wherein said error signal has magnitude zero when instantaneous power consumption by said electronic device is less than or equal to maximum adapter power.

6. The power supply as in claim 2, wherein said adapter has a controllable output voltage.

7. The power supply as in claim 6, further comprising a fourth line connecting said adapter and said electronic device, wherein said error signal is coupled to said fourth line.

8. The power supply as in claim 7, wherein said controllable output voltage is varied in response to said error signal.

9. An AC/DC or DC/DC adapter, comprising:
    a control terminal;
    circuitry to generate a reference voltage related to maximum adapter power and coupled to said control terminal;
    a controllable power converter having a variable DC output voltage that is supplied to an electronic device; and
    circuitry coupled to said control terminal and said controllable power converter and operable for receiving a control current from said electronic device, said variable DC output voltage that is supplied to said electronic device changing in relation to changes in said control current.

10. The AC/DC or DC/DC adapter as in claim 9, wherein said variable DC output voltage varies linearly from a minimum output voltage to a maximum output voltage as said control current varies linearly from zero to a maximum control current.

11. The AC/DC or DC/DC adapter as in claim 9, wherein said controllable power converter is a flyback converter.

12. The AC/DC or DC/DC adapter as in claim 9, comprising:
    a DC power output terminal;
    a ground terminal;
    a rectifier connected from an output of said controllable power converter to said DC power output terminal;
    a first resistor connected between said DC power output terminal and said control terminal;
    a second resistor connected between said control terminal and said ground terminal; and
    an amplifier having an inverting input, a noninverting input, and an amplifier output, said inverting input connected to said control terminal, said reference voltage coupled to said noninverting input, said amplifier output connected to an input of said controllable power converter.

13. An electronic device comprising:
    an adapter controller, comprising circuitry to generate a first signal related to instantaneous power consumption by said electronic device, circuitry to receive a reference signal related to maximum power of an adapter culpable to said electronic device, circuitry to compare said first signal to said reference signal, and circuitry to generate an error signal that has a magnitude related to an amount by which said first signal exceeds said reference signal, wherein an amount of voltage supplied by said adapter to said electronic device is based on said magnitude of said error signal; and
    a control terminal, said error signal coupled from said adapter controller to said control terminal.

14. The electronic device as in claim 13, wherein said reference signal is received on said control terminal.

15. The electronic device as in claim 13, wherein said reference signal is a voltage signal and said error signal is a current signal.

16. The electronic device as in claim 13, further comprising:
    a ground terminal; and
    a rechargeable battery with a first battery terminal coupled to said adapter controller and a second battery terminal coupled to said ground terminal.

17. The electronic device as in claim 16, wherein power to recharge said battery is reduced when instantaneous power consumption is greater than maximum adapter power.

18. The electronic device as in claim 16, wherein the voltage on said control terminal is related to a limit for allocating power to said battery.

19. An adapter controller for allocating power from an adapter between external electrical loads, comprising:
    a first terminal, a voltage on said first input terminal related to a voltage coupled to an external electrical load;
    a second terminal, the voltage difference between said first and second terminals related to a current flowing into an external electrical load;
    a third terminal, a voltage related to a limit for allocating power to an external electrical load coupled to said third terminal;
    a current sense amplifier with a first input connected to said first input terminal, a second input connected to said second input terminal, and a current sense output, an output signal related to the current flowing into an external electrical load coupled to said current sense output;

a power sense circuit with a first input connected to said first input line, a second input connected to said current sense output, and a power computation output, an output signal related to instantaneous power consumption by an external electrical load coupled to said power computation output;

an error amplifier with a first input connected to said power computation output, a second input connected to said control terminal, and an error output, an error signal representing the difference between said first and second inputs coupled to said error output; and a voltage controlled current source with a control input connected to said error output and a control signal output, an output current representing the amount by which instantaneous power consumption by an external electrical load exceeds said limit for allocating power coupled to said control signal output.

20. The adapter controller as in claim 19, wherein said control signal output is coupled to said third terminal.

21. The adapter controller as in claim 19, further comprising a fourth terminal, wherein said control signal output is coupled to said fourth terminal.

22. The adapter controller as in claim 19, wherein said error amplifier is an operational amplifier.

23. The adapter controller as in claim 19, wherein said error amplifier is an operational transconductance amplifier.

24. The adapter controller as in claim 19, wherein said current sense amplifier is an operational amplifier.

25. The adapter controller as in claim 19, wherein said current sense amplifier is a transconductance amplifier.

* * * * *